US012578865B2

(12) United States Patent
Yeung et al.

(10) Patent No.: US 12,578,865 B2
(45) Date of Patent: Mar. 17, 2026

(54) MEMORY BLOCK ERASE PROTOCOL

(71) Applicant: MICRON TECHNOLOGY, INC.,
Boise, ID (US)

(72) Inventors: Chun Sum Yeung, San Jose, CA (US);
Deping He, Boise, ID (US); Ting Luo,
Santa Clara, CA (US); Guang Hu,
Mountain View, CA (US); **Jonathan S.
Parry**, Boise, ID (US)

(73) Assignee: Micron Technology, Inc., Boise, ID
(US)

( * ) Notice: Subject to any disclaimer, the term of this
patent is extended or adjusted under 35
U.S.C. 154(b) by 0 days.

(21) Appl. No.: 18/787,528

(22) Filed: Jul. 29, 2024

(65) Prior Publication Data
US 2024/0385751 A1 Nov. 21, 2024

Related U.S. Application Data

(63) Continuation of application No. 17/898,333, filed on
Aug. 29, 2022, now Pat. No. 12,079,481.

(51) Int. Cl.
G06F 3/06 (2006.01)

(52) U.S. Cl.
CPC .......... G06F 3/0611 (2013.01); G06F 3/0653
(2013.01); G06F 3/0679 (2013.01)

(58) Field of Classification Search
CPC ..... G06F 3/0611; G06F 3/0653; G06F 3/0679
See application file for complete search history.

(56) References Cited

U.S. PATENT DOCUMENTS

| | | | |
|---|---|---|---|
| 7,103,734 B1 * | 9/2006 | Getzin | G06F 12/1408 |
| | | | 711/100 |
| 2017/0351603 A1 * | 12/2017 | Zhang | G06F 3/0604 |
| 2020/0225863 A1 * | 7/2020 | Veluswamy | G06F 3/0647 |
| 2021/0073118 A1 | 3/2021 | Masuo et al. | |
| 2021/0294737 A1 * | 9/2021 | Wang | G06F 12/0822 |
| 2022/0058136 A1 | 2/2022 | Li | |

* cited by examiner

*Primary Examiner* — Sean D Rossiter
(74) *Attorney, Agent, or Firm* — Lowenstein Sandler LLP

(57) ABSTRACT

Described are systems and methods related to a memory
block erase protocol. An example system includes a memory
device having a memory array including a plurality of
memory cells. The system further includes a processing
device coupled to the memory device. The processing device
is to determine a value of a program-erase cycle count
associated with at least a portion of the plurality of memory
cells. The processing device is further to erase, based on the
value of the PEC count, less than a predetermined portion of
free sets of memory cells to form an erased set of memory
cells. The processing device is further to receive a program-
ming command directed to at least a portion of the erased set
of memory cells. The processing device is further to perform
a programming operation with respect to the at least a
portion of the erased set of memory cells.

20 Claims, 8 Drawing Sheets

400

MEMORY BLOCK ERASE PROTOCOL

RELATED APPLICATIONS

This application is a continuation of application Ser. No. 17/898,333, filed Aug. 29, 2022, the entire content of which is incorporated by reference herein.

TECHNICAL FIELD

Embodiments of the disclosure relate generally to memory sub-systems, and more specifically, to memory read calibration based on memory device-originated metrics characterizing voltage distributions.

BACKGROUND

A memory sub-system can be a storage system, a memory module, or a hybrid of a storage device and memory module. The memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
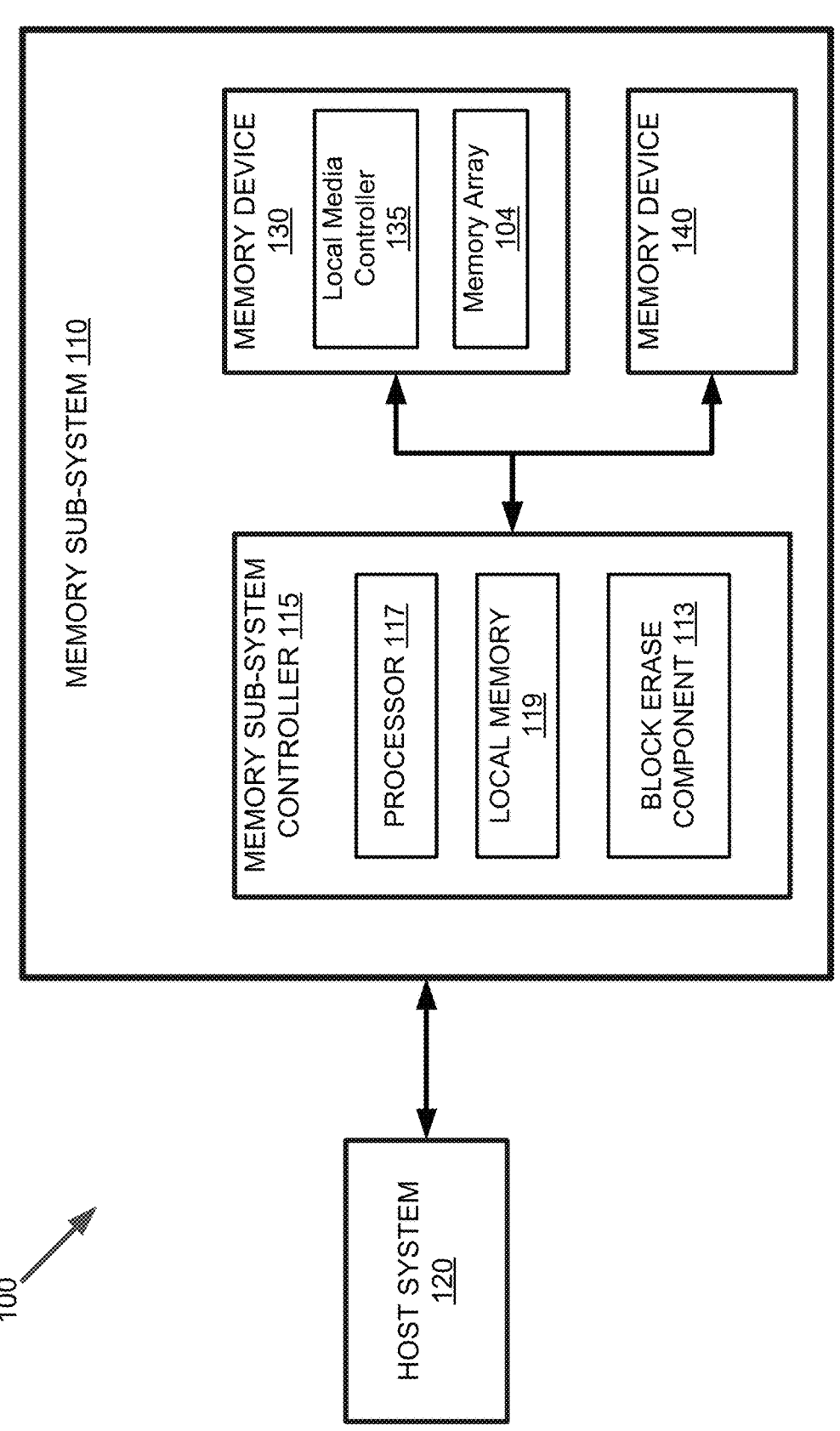
FIG. 1 illustrates an example computing system that includes a memory sub-system in accordance with some implementations of the present disclosure.

Aspects of the present disclosure are directed to a memory block erase protocol. One or more memory devices can be a part of a memory sub-system, which can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can include two or more planes. For some types of non-volatile memory devices (e.g., NAND devices), each plane includes of a set of physical blocks. In some implementations, each block can include multiple sub-blocks. Each plane carries a matrix of memory cells formed onto a silicon wafer and joined by conductors referred to as wordlines and bitlines, such that a wordline joins multiple memory cells forming a row of the matric of memory cells, while a bitline joins multiple memory cells forming a column of the matric of memory cells.

Depending on the cell type, each memory cell can store one or more bits of binary information, and has various logic states that correlate to the number of bits being stored. The logic states can be represented by binary values, such as "0" and "1", or combinations of such values. A memory cell can be programmed (written to) by applying a certain voltage to the memory cell, which results in an electric charge being held by the memory cell, thus allowing modulation of the voltage distributions produced by the memory cell. A set of memory cells referred to as a memory page can be programmed together in a single operation, e.g., by selecting consecutive bitlines.

To program a memory cell with data, the memory cell is first erased. Conventionally, a block of memory cells are erased immediately prior to programming memory cells of the memory block. Erasing the block of memory cells (e.g., memory block) immediately before programming introduces latency into programming operations. For example, write operations are paused while the memory block is erased. After the memory block is erased, the write operations can resume. This latency may be especially troublesome when programming operations are to occur as quickly as possible.

Other conventional approaches blindly pre-erase memory blocks. In such conventional approaches, memory blocks are erased without regard to future programming operations. Blindly erasing memory blocks can introduce further complications. For example, memory cells that are erased in single-level cell (SLC) mode cannot be programmed with triple-level cell (TLC) data. Conversely, memory cells that are erased in TLC mode cannot be programmed with SLC data. A conventional approach may blindly erase all available memory blocks (e.g., substantially all available memory blocks) in SLC mode. Thus, there may be no memory blocks left to service a TLC write operation. One or more already-erased memory blocks are then re-erased in TLC mode to service the TLC write operation. The re-erase introduces further latency to the programming operation and multiple re-erase operations may damage the memory cells over time.

Additionally, blindly pre-erasing memory blocks can introduce data errors. For example, the voltage state (e.g., erase state) of memory cells that have been erased may shift over time. The voltage shift may cause any data that is later programmed to the memory cell to be defective. In such examples, the data stored in the memory cell may not reliably read. A conventional solution is to verify the voltage state of the memory cells prior to programming the memory cells. The verification process conventionally examines each memory cell and/or each wordline of the memory block to determine whether the state of the memory cells has shifted beyond a predetermined threshold. However, checking each memory cell and/or wordline prior to performing the programming operation (e.g., the write operation) can take a substantial amount of time, again introducing latency to the programming operation. Again, this latency may be especially troublesome when programming operations are to occur as fast as possible. Without the verification used in some conventional solutions, the data may be unreliable when written to erased memory cells that have experienced voltage shift over time.

Implementations of the present disclosure address the above-referenced and other deficiencies by providing an improved memory block erase protocol. In some embodiments, a processing device (e.g., a memory sub-system controller, a local media controller, etc.) can implement the improved protocol to erase memory blocks in preparation for reliably servicing write operations without introducing undue latency. Based on a metric associated with the memory array, the processing device may initiate the erase protocol of the memory device. In some embodiments, the metric includes a program-erase cycle (PEC) count of one or more memory blocks of the memory array. In some embodiments, the metric is reflective of an average PEC count of all the memory blocks of the memory device. The erase protocol may include pre-erasing a number of memory blocks in preparation for servicing write operations. Specifically, the erase protocol may be activated (e.g., initiated, etc.) when the metric (e.g., PEC count) is below a predetermined threshold. In some embodiments, the erase protocol may be activated at times where the memory device is to service programming operations as fast as possible. This may include times where the memory device is new and/or undergoing initial set-up procedures (e.g., initial host booting, etc.).

In some embodiments, the erase protocol includes determining an amount of available free memory blocks (e.g., a number of free memory blocks). Based on how many memory blocks are free (e.g., available, etc.), a portion of the free memory blocks are erased. Erasing only a portion of the free memory blocks in a specific erase mode (such as SLC) allows some memory blocks to remain available for programming in another mode (such as TLC) without having to re-erase the memory blocks. In some embodiments, subsequent to receiving a programming command, a check is performed on an erased memory block. The check may be an erased page check to check that the memory cells of a first memory page of the erased memory block are in an erased state. Because memory cells are erased at a block level (e.g., all memory cells of the memory block are erased in one operation), it logically follows that the erase state of the memory cells of one memory page of the memory block are reflective of the erase state of all the memory cells of the memory block. In some embodiments, subsequent to the erased page check, the erased memory block may be ready to service a write command Data may then be programmed to the memory cells of the erased memory block.

Advantages of the approaches described herein include, but are not limited to, improved performance in the memory sub-system. By erasing memory blocks prior to receiving a programming command (e.g., pre-erasing memory blocks), programming operation latency is reduced. Thus, write operations can commence faster than allowed when using conventional solutions. Additionally, by checking a page of the memory block prior to writing data to the memory cells of the memory block, it can be verified that the memory cells can be reliably programmed based on the erase state of the memory cells of the page. Further, by checking just a page of the memory block instead of verifying each memory cell, wordline, and/or page of the memory block (as done in some conventional methods), programming operation latency can be reduced while still providing reliability for data programming and/or data storage when compared to conventional methods.

While the examples described herein involve SLC and/or TLC voltage distributions, in various other implementations, similar techniques can be implemented for memory pages storing other numbers of bits per cell.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., one or more memory device(s) 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., the one or more memory device(s) 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device(s) 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 can include one or more arrays of memory cells. One type of memory cell, for example, single-level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM).

A memory sub-system controller 115 (or controller 115 for simplicity) can communicate with the memory device(s) 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device(s) 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory device(s) 130. The memory sub-system controller 115 can further include host interface circuitry to communicate with the host system 120 via the physical host interface. The host interface circuitry can convert the commands received from the host system into command instructions to access the memory device(s) 130 as well as convert responses associated with the memory device(s) 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device(s) 130.

In some embodiments, the memory device(s) 130 include local media controllers 135 that operate in conjunction with memory sub-system controller 115 to execute operations on one or more memory cells of the memory device(s) 130. An external controller (e.g., memory sub-system controller 115) can externally manage the memory device 130 (e.g., perform media management operations on the memory device(s) 130). In some embodiments, a memory device 130 is a managed memory device, which is a raw memory device (e.g., memory array 104) having control logic (e.g., local controller 135) for media management within the same memory device package. An example of a managed memory device is a managed NAND (MNAND) device. Memory device(s) 130, for example, can each represent a single die having some control logic (e.g., local media controller 135) embodied thereon. In some embodiments, one or more components of memory sub-system 110 can be omitted.

In one embodiment, the memory sub-system 110 includes a block erase component 113. In some embodiments, upon determining a metric associated with memory array 104 (e.g., a PEC count), and determining that the value of the metric is below a threshold amount (e.g., that the average PEC count is below a predetermined threshold), the block erase component 113 may initiate an erase protocol of the memory device. As described herein, the erase protocol may include determining how many memory blocks are available (e.g., free) for programming operations. Based on how many memory blocks are available, the block erase component 113 may erase the memory cells of a number of the available memory blocks. In some embodiments, the memory cells are erased in SLC mode in preparation for servicing SLC write operations. However, in some embodiments, the memory cells are erased in TLC mode in preparation for servicing TLC write operations, or in quad-level cell (QLC) mode for servicing QLC write operations, in N-level cell mode for servicing N-level cell write operations (where N is any integer), etc. The block erase component 113 may erase a number of memory blocks to form a queue of memory blocks ready to service write operations. Upon receiving a programming command (e.g., from host system 120, etc.), the block erase component 113 may check that voltage levels in an erased memory block have not crept (e.g., drifted, etc.) beyond a threshold amount since the memory block was erased. The block erase component 113 may check the memory cells of a first page of the memory block to determine that the memory cells are still in an erased state. If the memory cell voltage levels are not in a state for reliable programming (e.g., the voltage levels have crept, the memory cells are not in an erased state, etc.), the memory block is re-erased and put back in the queue. If the memory cell voltage levels indicate that the memory cells are in an erased state ready for programming, the programming operation (e.g., write operation) is performed with respect to the memory cells of the erased memory block. In some embodiments, the block erase component 113 may determine at some time that the metric (e.g., PEC count) is above (e.g., exceeds) the threshold, at which point the block erase component 113 may terminate the erase protocol. Further details with regards to the operations of block erase component 113 are described below.

Figure 2:
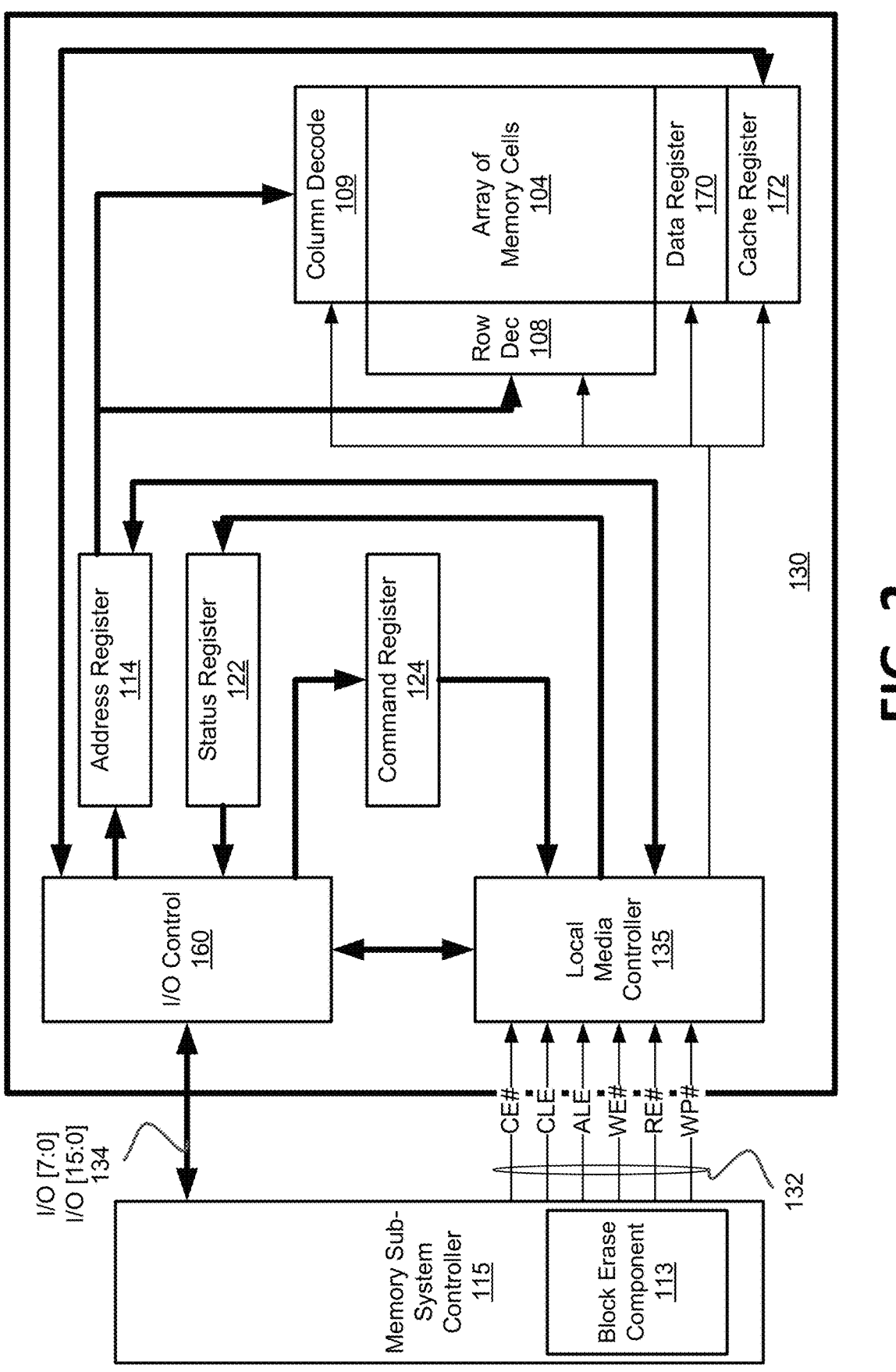
FIG. 2 is a block diagram of a memory device in communication with a memory sub-system controller of a memory sub-system, according to an embodiment.

FIG. 2 is a simplified block diagram of a first apparatus, in the form of a memory device 130, in communication with a second apparatus, in the form of a memory sub-system controller 115 of a memory sub-system (e.g., memory sub-system 110 of FIG. 1), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device. In some embodiments, memory sub-system controller 115 includes block erase component 113 configured to perform the memory block erase operations described herein including erasing memory blocks prior to programming operations being performed with respect to those blocks.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bit line). A single access line may be associated with more than one logical row of memory cells and a single data line may be associated with more than one logical column. Memory cells (not shown in FIG. 1B) of at least a portion of array of memory cells 104 are capable of being programmed to one of at least two target data states.

Row decode circuitry 108 and column decode circuitry 109 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 109 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 109 to control the row decode circuitry 108 and column decode circuitry 109 in response to the addresses.

The local media controller 135 is also in communication with a cache register 172. Cache register 172 latches data, either incoming or outgoing, as directed by the local media controller 135 to temporarily store data while the array of memory cells 104 is busy writing or reading, respectively, other data. During a program operation (e.g., write operation), data may be passed from the cache register 172 to the data register 170 for transfer to the array of memory cells 104; then new data may be latched in the cache register 172 from the I/O control circuitry 160. During a read operation, data may be passed from the cache register 172 to the I/O control circuitry 160 for output to the memory sub-system controller 115; then new data may be passed from the data register 170 to the cache register 172. The cache register 172 and/or the data register 170 may form (e.g., may form a portion of) a page buffer of the memory device 130. A page buffer may further include sensing devices (not shown in FIG. 2) to sense a data state of a memory cell of the array of memory cells 104, e.g., by sensing a state of a data line connected to that memory cell. A status register 122 may be in communication with I/O control circuitry 160 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE#, a command latch enable signal CLE, an address latch enable signal ALE, a write enable signal WE#, a read enable signal RE#, and a write protect signal WP#. Additional or alternative control signals (not shown) may be further received over control link 132 depending upon the nature of the memory device 130. In some embodiments, memory device 130 receives command signals (which represent commands), address signals (which represent addresses), and data signals (which represent data) from the memory sub-system controller 115 over a multiplexed input/output (I/O) bus 134 and outputs data to the memory sub-system controller 115 over I/O bus 134.

For example, the commands may be received over input/output (I/O) pins [7:0] of I/O bus 134 at I/O control circuitry 160 and may then be written into command register 124. The addresses may be received over input/output (I/O) pins [7:0] of I/O bus 134 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 172. The data may be subsequently written into data register 170 for programming the array of memory cells 104.

In an embodiment, cache register 172 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIG. 2 has been simplified. It should be recognized that the functionality of the various block components described with reference to FIG. 2 may not necessarily be segregated to distinct components or component portions of an integrated circuit device. For example, a single component or component portion of an integrated circuit device could be adapted to perform the functionality of more than one block component of FIG. 2. Alternatively, one or more components or component portions of an integrated circuit device could be combined to perform the functionality of a single block component of FIG. 2. Additionally, while specific I/O pins are described in accordance with popular conventions for receipt and output of the various signals, it is noted that other combinations or numbers of I/O pins (or other I/O node structures) may be used in the various embodiments.

One or more memory devices of the memory sub-system 110 can be represented, e.g., by NAND memory devices that utilize transistor arrays built on semiconductor chips. As illustrated schematically in FIG. 3A, a memory cell of a memory device can be a transistor, such as metal-oxide-semiconductor field effect transistor (MOSFET), having a source(S) electrode and a drain (D) electrode to pass electric current there through. The source and drain electrodes can be connected to a conductive bitline (BL), which can be shared by multiple memory cells. A memory device can include an array or memory cells that are connected to a plurality of wordlines (WL) and a plurality of bitlines (BL), as schematically illustrated by FIG. 4. A memory device can further include circuitry for selectively coupling WLs and BLs to voltage sources providing control gate and source-drain signals, which is omitted from FIG. 4 for clarity and conciseness.

Referring again to FIG. 3A, memory cells 302 and 304 can be connected to the same bitline N and two different conductive wordlines, M and M+1, respectively. A memory cell can further have a control gate (CG) electrode to receive a voltage signal $V_{CG}$ to control the magnitude of electric current flowing between the source electrode and the drain electrode. More specifically, there can be a threshold control gate voltage $V_T$ (herein also referred to as "threshold voltage" or simply as "threshold") such that for $V_{CG}<V_T$, the source-drain electric current can be low, but can increase substantially once the control gate voltage has exceeded the threshold voltage, $V_{CG}>V_T$. Transistors of the same memory device can be characterized by a distribution of their threshold voltages, $P(V_T)=dW/dV_T$, so that $dW=P(V_T)dV_T$ represents the probability that any given transistor has its threshold voltage within the interval $[V_T, V_T+dV_T]$. For example, FIG. 3B illustrates schematically dependence of the source-drain current $I_{SD}$ on the control gate voltage for two memory cells, e.g. memory cell 302 (solid line) and memory cell 304 (dashed line), having different threshold control gate voltages.

Figure 3:
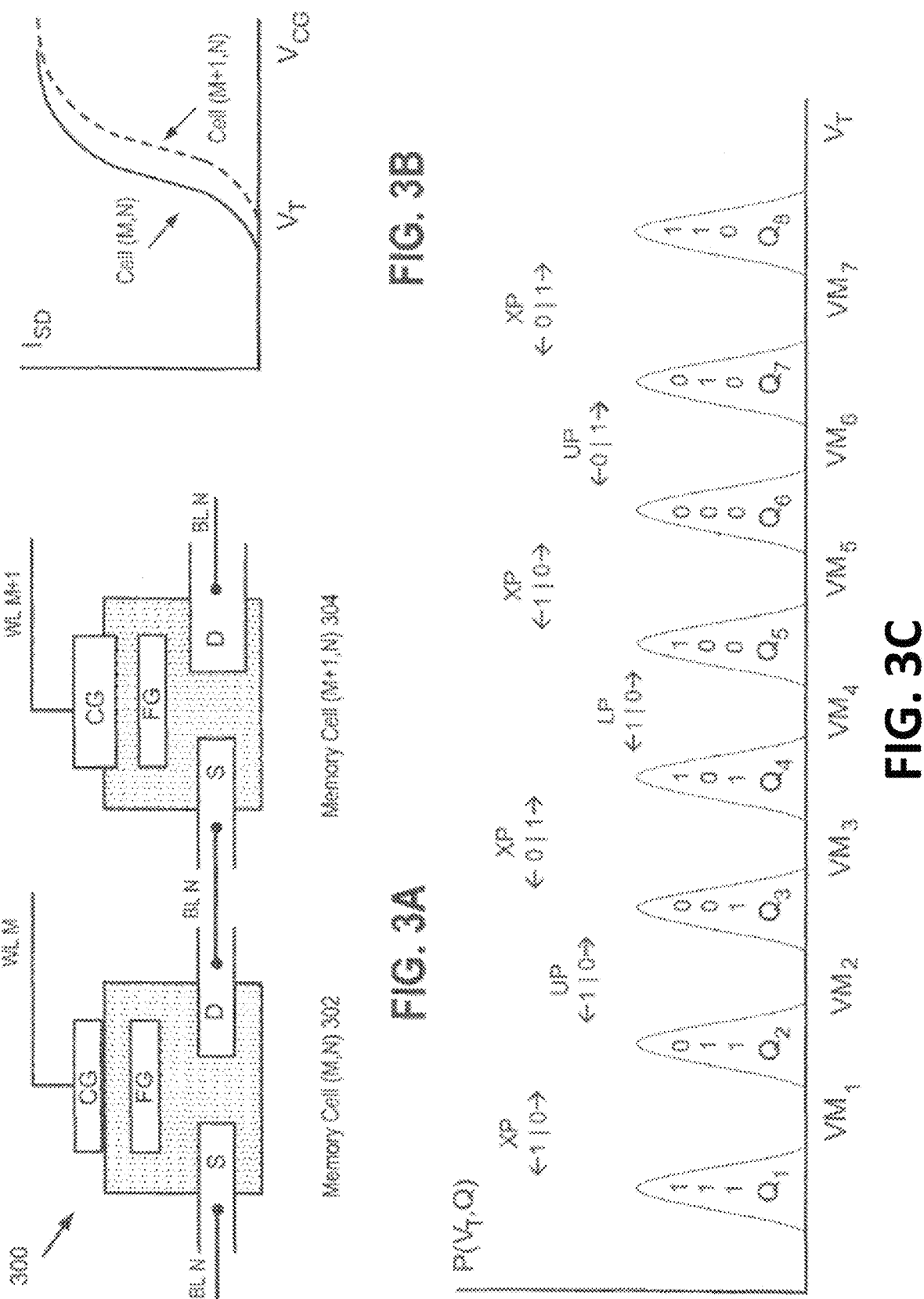
FIG. 3A schematically illustrates a set of memory cells as arranged in a memory device.
FIG. 3B schematically illustrates schematically dependence of the source-drain current on the control gate voltage for two memory cells.
FIG. 3C schematically illustrates an example distribution of threshold control gate voltages for a set of memory cells.
Figure 4:
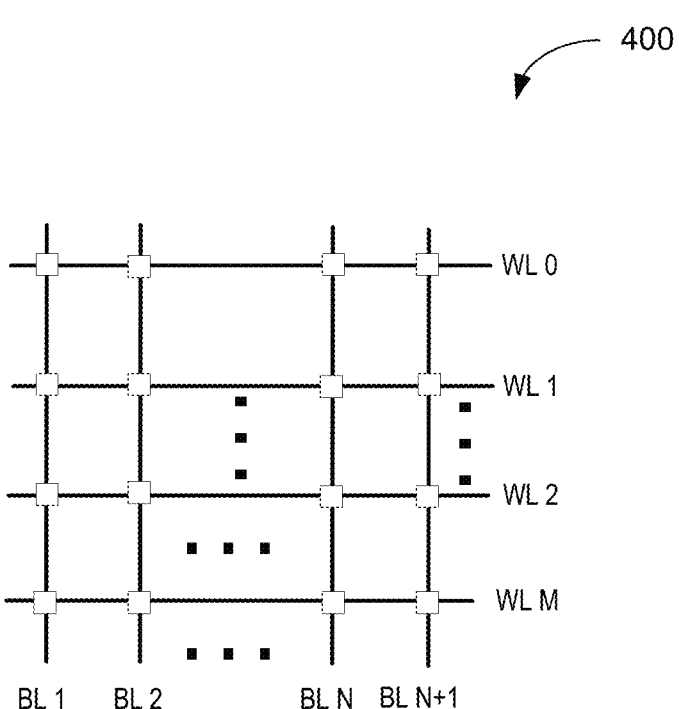
FIG. 4 schematically illustrates an example memory array.

To make a memory cell non-volatile, the cell can be further equipped with a conducting island—a charge storage node—that can be electrically isolated from the control gate, the source electrode, and the drain electrode by insulating layers (depicted in FIG. 3A as the dotted region). In response to an appropriately chosen positive (in relation to the source potential) control gate voltage $V_{CG}$, the charge storage node can receive an electric charge Q, which can be permanently stored thereon even after the power to the memory cell—and, consequently, the source-drain current—is ceased. The charge Q can affect the distribution of threshold voltages $P(V_T,Q)$. Generally, the presence of the electric charge Q shifts the distribution of threshold voltages towards higher voltages, compared with the distribution $P(V_T)$ for an uncharged charge storage node. This happens because a stronger positive control gate voltage $V_{CG}$ can be needed to overcome a negative potential of the charge storage node charge Q. If any charge of a sequence $Q_k$ of charges with $1 \leq k \leq 2^N$ can be selectively programmed (and later detected during a read operation) into a memory cell, the memory cell can function as an N-bit storage unit. The charges $Q_k$ are preferably selected to be sufficiently different from each other, so that any two adjacent voltage distributions $P(V_T, Q_k)$ and $P(V_T, Q_{k+1})$ do not overlap being separated by a valley margin, so that $2^N$ distributions $P(V_T, Q_k)$ are inter-spaced with $2^N-1$ valley margins.

FIG. 3C illustrates schematically a distribution of threshold control gate voltages for a set of memory cells capable of storing three bits of data by programming the memory cell into at least eight charge states that differ by the amount of charge on the cell's charge storage node. FIG. 3C shows distributions of threshold voltages $P(V_T, Q_k)$ for $2^N=8$ different charge states of a tri-level cell (TLC) separated with $2^3-1=7$ valley margins $VM_k$. Accordingly, a memory cell programmed into a charge state k-th (i.e., having the charge $Q_k$ deposited on its charge storage node) can be storing a particular combination of N bits (e.g., 0110, for N=4). This charge state $Q_k$ can be determined during a readout operation by detecting that a control gate voltage $V_{CG}$ within the valley margin $VM_k$ is sufficient to open the cell to the source-drain current whereas a control gate voltage within the preceding valley margin $VM_{k-1}$ is not.

Memory devices can be classified by the number of bits stored by each cell of the memory. For example, a single-level cell (SLC) memory has cells that can each store one bit of data (N=1). A multi-level cell (MLC) memory has cells that can each store up to two bits of data (N=2), a tri-level cell (TLC) memory has cells that can each store up to three bits of data (N=3), and a quad-level cell (QLC) memory has cells that can each store up to four bits of data (N=4). In general, the operations described herein can be applied to memory devices having N-bit memory cells, where N>1.

For example, a TLC can be capable of being in one of eight charging states $Q_k$ (where the first state is an uncharged state $Q_1=0$) whose threshold voltage distributions are separated by valley margins $VM_k$ that can be used to read out the data stored in the memory cells. For example, if it is determined during a read operation that a read threshold voltage falls within a particular valley margin of $2^N-1$ valley margins, it can then be determined that the memory cell is in a particular charge state out of $2^N$ possible charge states. By identifying the right valley margin of the cell, it can be determined what values all of its N bits have. The identifiers of valley margins (such as their coordinates, e.g., location of centers and widths) can be stored in a read level threshold register of the memory controller 215.

As noted herein above, the memory controller 215 can program a state of the memory cell and then read can read this state by comparing a read threshold voltage $V_T$ of the memory cell against one or more read level thresholds. The read operation can be performed after a memory cell is placed in one of its charged states by a previous programming operation, which can include one or more programming passes. Each programming pass would apply appropriate programming voltages to a given wordline in order place appropriate charges on the charge storage nodes of the memory cells that are connected to the wordline.

A programming operation involves a sequence of programming voltage pulses that are applied to a selected (target) wordline (i.e., the wordline that is electrically coupled to the target memory cells). Referring again to FIG. 3A, the source(S) and drain (D) electrodes of a memory cell can be connected to a conductive bitline shared by multiple memory cells. A programming operation would apply a sequence of programming voltage pulses to the control gate (CG) via a corresponding wordline (WL). Each programming voltage pulse would induce an electric field that would pull the electrons onto the charge storage node. After each programming pulse is applied to the selected wordline, a verify operation can be performed by reading the memory cell in order to determine whether the threshold voltage $V_T$ of the memory cell has reached a desired value (voltage verify level). If the threshold voltage $V_T$ of the memory cell has reached the verify voltage associated with the desired state, the bitline to which the memory cell is connected can be biased at the program inhibit voltage, thus inhibiting the memory cells that are coupled to the bitline from being further programmed, i.e., to prevent the threshold voltage $V_T$ of the memory cells from shifting further upward in response to subsequent programming pulses applied to the selected wordline.

Figure 5:
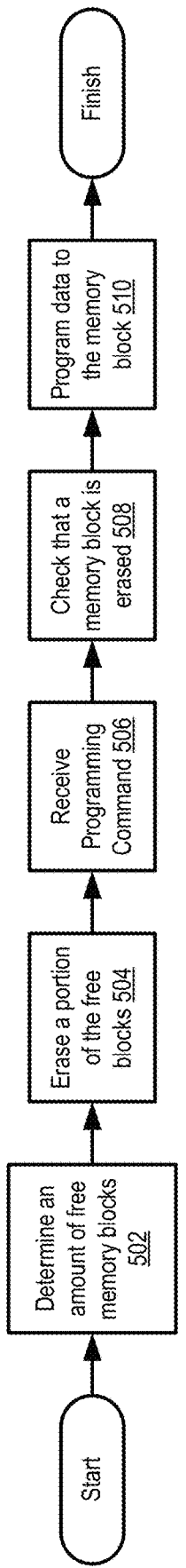
FIG. 5 is a flow diagram of an example method of memory block programming in accordance with some implementations of the present disclosure.

FIG. 5 is a flow diagram of an example method 500 of memory block programming in accordance with some implementations of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, the method 500 is performed by the memory sub-system controller 115 and/or the local media controller 135 of FIG. 1.

Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment.

At block 502, processing logic (e.g., of block erase component 113 of FIG. 1), determines an amount of free memory blocks available for programming operations. At block 504, a portion of the free memory blocks are erased (e.g., the memory cells of the portion of the free memory blocks are erased). In some embodiments, the memory blocks are erased in SLC mode in preparation for servicing SLC write operations. The portion of memory blocks that are erased may be based on the amount of free memory blocks available. In some examples, a minority (e.g., less than half) of the free memory blocks are erased. This way, should a TLC programming command be later received, a free memory block can be erased in TLC mode without re-erasing a memory block already erased in SLC mode. In some embodiments, the number of erased free memory blocks is capped. For example, in some instances, only a predetermined maximum number of memory blocks may be erased at any one time. Capping the number of memory blocks that can be erased at a given time may alleviate adverse effects of voltage drift while the memory cells are in the erased state by potentially shortening the time the memory cells are erased before programming operations.

At block 506, processing logic may receive a programming command. In many embodiments, the programming command is a command to commence a write operation to a set of erased memory cells (e.g., of an erased memory block). At block 508, processing logic may check that a memory block in queue is erased. In some embodiments, the processing logic checks a first page of the erased memory block to determine that the memory cells are in an erased state. By checking the first page of the erased memory block (e.g., the memory cells of the first page), the processing logic can determine that all the memory cells of the memory block (e.g., substantially all the memory cells of the memory block, nearly all the memory cells, etc.) are in an erased state. This is because the memory cells are erased at a block level, meaning all memory cells of the memory block are erased in one operation. Thus, based on checking the memory cells of the first page of the memory block, it can be determined that all memory cells of the memory block are erased. If the memory cells are found to be in an erased state, the memory block may be ready for programming. If the memory cells are found not to be in a state for programming, the memory block may be re-erased.

At block 510, processing logic executes the programming command (e.g., received at block 506). In some embodiments, data is programmed to the erased memory block via a write operation. In some examples, the write operation is an SLC write operation to write SLC data to a memory block erased in SLC mode. In other examples, the write operation is a TLC write operation to write TLC data to a memory block erased in TLC mode or a N-level cell write operation to write N-level cell data to a memory block erased in N-level cell mode (where N is any integer as described herein above). In some embodiments, the programming operation may be a "write boost" operation where data is to be written in SLC to the memory block as fast as possible.

Figure 6:
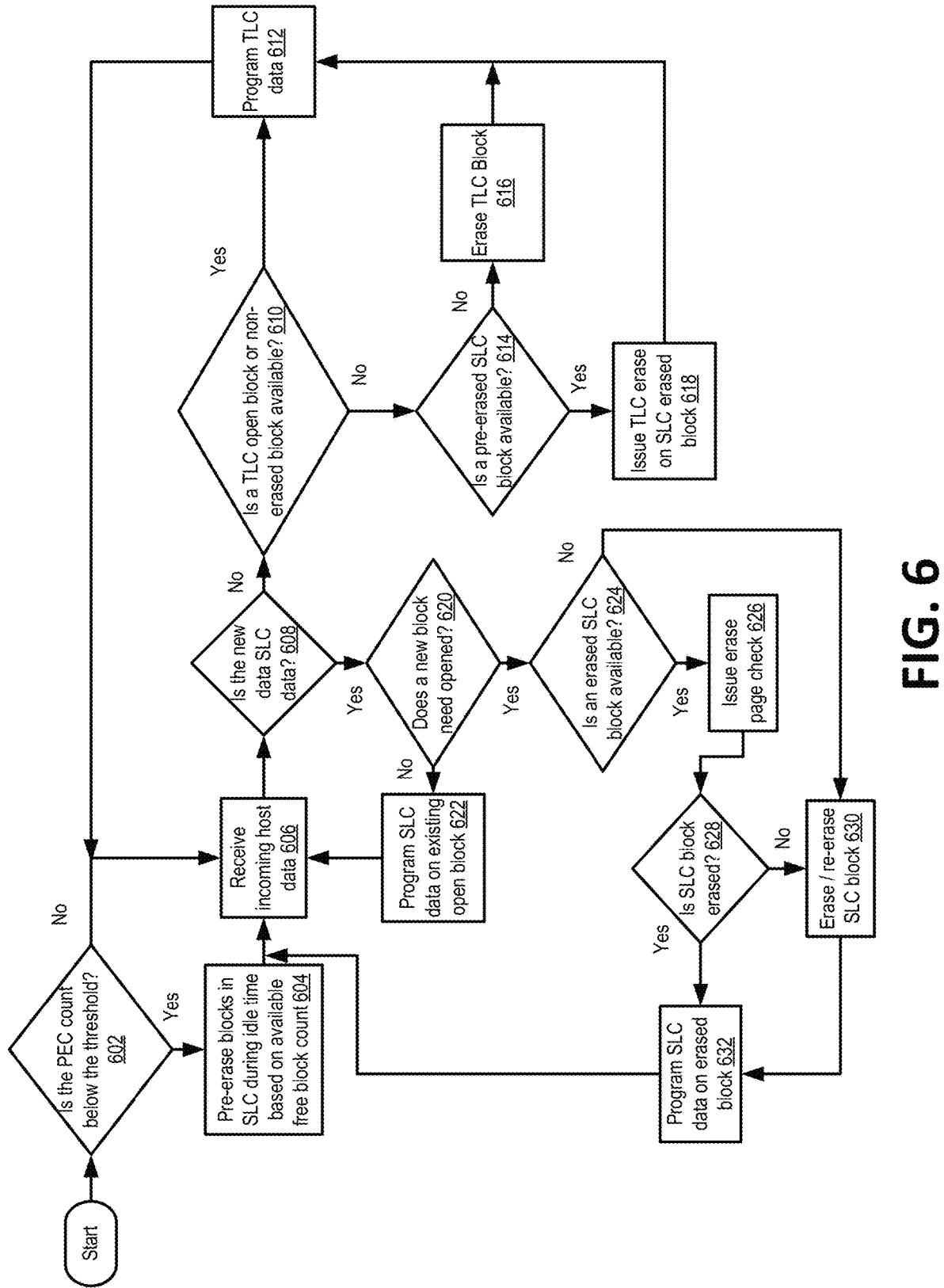
FIG. 6 is a flow diagram of an example method of a memory block handling protocol in accordance with some implementations of the present disclosure.

FIG. 6 is a flow diagram of an example method 600 of a memory block handling protocol in accordance with some implementations of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, the method 600 is performed by the memory sub-system controller 115 and/or the local media controller 135 of FIG. 1.

Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment.

At operation 602, processing logic (e.g., of block erase component of FIG. 1) determines whether the PEC count (e.g., average PEC count of all the memory blocks of the memory device) is below a predetermined threshold. In some embodiments, the threshold corresponds to a portion of the lifetime of the memory device. For example, a PEC count below a threshold (e.g., 10% of a total expected PEC lifetime of the memory device) indicates that the memory device is relatively new. In some embodiments, if the PEC count is below the threshold, the processing logic may initiate a memory block erase protocol as described herein. If the processing logic determines that the PEC count is below the threshold, the method proceeds to operation 604. Otherwise, the method proceeds to operation 606. In some embodiments, after initiating the memory block erase protocol, the processing logic may determine that the PEC count is above the threshold, at which point the processing logic may terminate the block erase protocol.

At operation 604, processing logic causes available memory blocks to be pre-erased in SLC mode during idle time (e.g., idle time of the processing device performing the operations, etc.). In some embodiments, the number of memory blocks that are pre-erased is based upon the number of memory blocks available (e.g., memory blocks free for programming). For example, a predetermined portion (e.g., one third) of the available memory blocks may be erased in preparation for programming In some embodiments, the number of memory blocks that are pre-erased is capped (e.g., at a predetermined maximum number of pre-erased memory blocks).

At operation 606, processing logic may receive incoming data (e.g., host data). The data may be received responsive to a programming command, in some embodiments.

At operation 608, processing logic determines whether the incoming data is SLC data. Whether the incoming data is SLC data may be indicative of a "write boost" event, meaning the data is to be written as fast as possible (e.g., with as little latency as possible). If the incoming data is not SLC data (e.g., the incoming data is TLC data), the method proceeds to operation 610. If the incoming data is SLC data, the method proceeds to operation 620.

At operation 610, processing logic determines whether a memory block erased in TLC mode and/or a non-erased memory block is available. In some embodiments, as described herein, TLC data cannot be written to memory cells (e.g., of a memory block) erased in SLC mode. Similarly, SLC data cannot be written to memory cells erased in TLC mode. If a memory block is available (e.g., a memory block erased in TLC mode is available and/or a non-erased memory block is available), the method proceeds to operation 612. If no memory block is available, the method proceeds to operation 614.

At operation 612, processing logic may program TLC data to a memory block erased in TLC mode. In instances where a non-erased block was determined to be available at operation 610, the processing logic may first erase the memory block in TLC mode before the TLC data can be programmed. After programming the TLC data, the method may loop back to operation 606.

At operation 614, processing logic determines whether a memory block pre-erased in SLC mode is available. Such a memory block may have been erased at operation 604. If an SLC pre-erased memory block is available the method may proceed to operation 618. If no SLC pre-erased memory block is available, the method may proceed to operation 616. The unavailability of a SLC pre-erased memory block may be indicative of the availability of a memory block that has not yet been erased.

At operation 616, processing logic may erase (e.g., cause to be erased) a free memory block in TLC mode. The TLC erased memory block may be ready for programming operations at operation 612.

At operation 618, processing logic may re-erase (e.g., cause to be re-erased) an SLC erased memory block in TLC mode. A memory block that was previously erased in SLC mode may be re-erased in TLC mode to service TLC programming at operation 612.

At operation 620, processing logic determines whether a new memory block is to be opened. In some embodiments, the determination is based on the capacity of the existing open block (e.g., how many memory cells of the existing open block are available for data to be written) and/or based on the amount of time that has elapsed since the last programming operation directed to the existing open memory block was performed. If a new memory block is to be opened, the method proceeds to operation 624. If no new memory block is to be opened, the method proceeds to operation 622.

At operation 622, processing logic causes the incoming SLC data (e.g., received at operation 606) to be programmed to the existing open memory block. After the data is programmed, the method may loop back to operation 606.

At operation 624, processing logic determines whether an SLC erased memory block (e.g., erased at operation 604) is available for programming. If no SLC erased block is available, the method proceeds to operation 630. In such an instance, an available free memory block is erased in SLC mode in preparation for SLC programming. If an SLC erased block is available, the method proceeds to operation 626.

At operation 626, processing logic issues an erased page check as described herein. At operation 628, processing logic checks the first page (e.g., a subset of memory cells) of the erased memory block to determine whether the memory cells of the memory block are in an erased state (e.g., that the voltage levels of the memory cells have not crept and/or drifted, that the memory cells are in a state suitable for reliable programming, etc.). If the memory cells are in the erased state, the method proceeds to operation 632. If the memory cells are not in the erased state (e.g., the voltage levels of the memory cells have crept and/or drifted, that the memory cells are not in a state suitable for reliable programming, etc.), the method proceeds to operation 630.

At operation 630, processing logic causes the memory block to be erased or re-erased in SLC mode. Responsive to determining that the memory cells are not in the erased state (at operation 628), the memory block may be erased (e.g., re-erased) in SLC mode to put the memory cells in the erased state (e.g., a state suitable for reliable programming) As already described herein above, responsive to determining that no erased SLC block is available (at operation 624), an available free memory block is erased in SLC mode.

At operation 632, processing logic programs SLC data to the erased memory block. The method then loops back to operation 606.

Figures 7A, 7B:
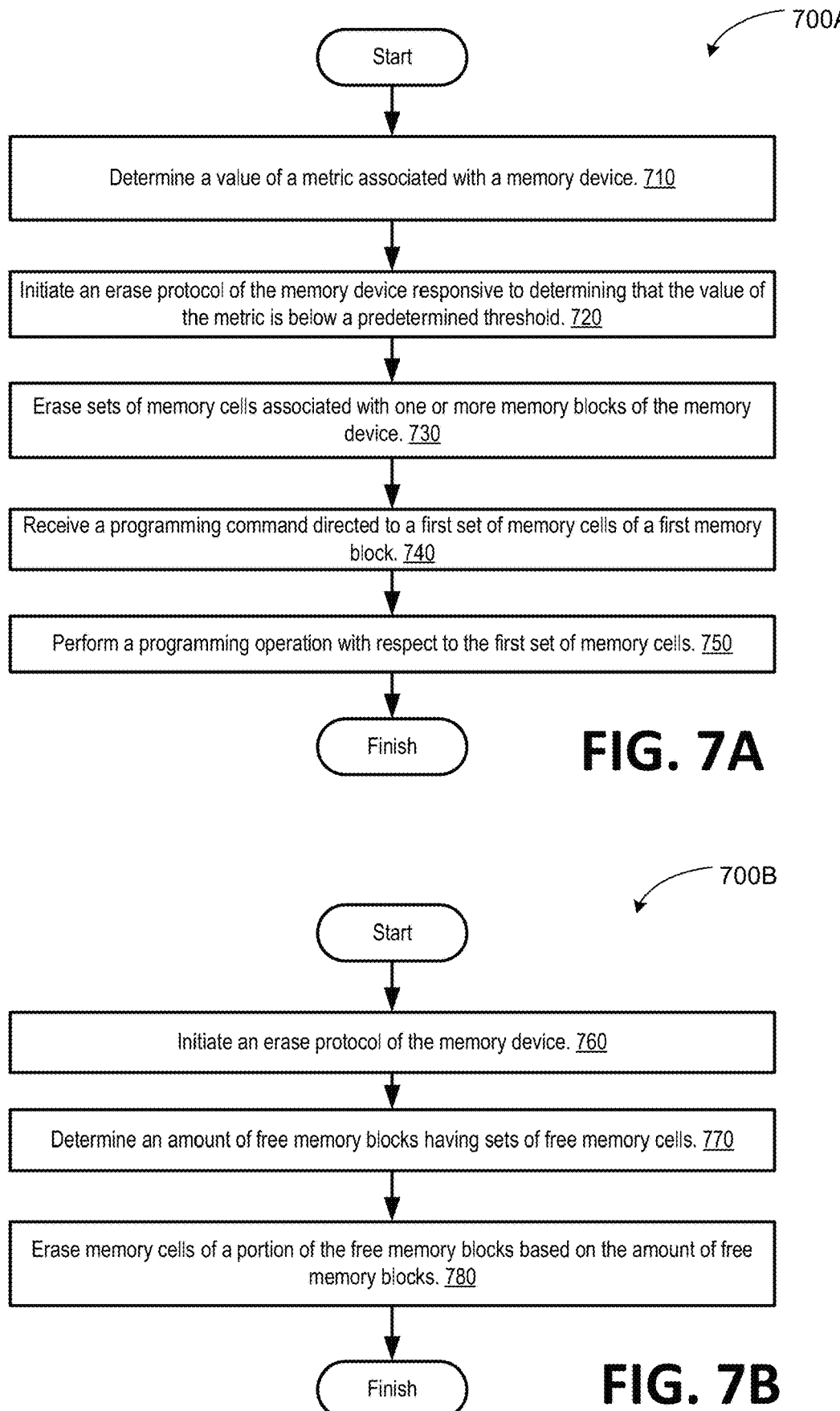
FIG. 7A is a flow diagram of an example method of programming data to a memory block in accordance with some implementations of the present disclosure.
FIG. 7B is a flow diagram of an example method of a memory block erase protocol in accordance with some implementations of the present disclosure.

FIG. 7A is a flow diagram of an example method 700A of programming data to a memory block in accordance with some implementations of the present disclosure. The method 700A can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, the method 700A is performed by the memory sub-system controller 115 and/or the local media controller 135 of FIG. 1.

Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment.

At block 710, processing logic (e.g., of block erase component 113 of FIG. 1), determines a value of a metric associated with a memory device. In some embodiments, the metric includes an average program-erase cycle count of a plurality of memory blocks of the memory device. The average PEC count may be indicative of a relative age of the memory device. For example, a low average PEC count may reflect that most memory blocks of the memory device have a low PEC count, which in turn indicates that the memory device is relatively new and/or unused. Similarly, a high average PEC count may reflect that most memory blocks of the memory device have a high PEC count, which in turn indicates that the memory device is relatively old and/or well-used.

At block 720, processing logic initiates an erase protocol of the memory device as described herein. The erase protocol may be initiated responsive to determining that the value of the metric (e.g., determined at block 710) is below a predetermined threshold. In some examples, the processing logic may determine that the average PEC count of the memory device is below a threshold (e.g., 10% of the total lifetime PEC of the memory device).

At block 730, processing logic erases sets of memory cells associated with one or more memory blocks of the memory device. In some embodiments, each memory block is made up of a set of memory cells, and the set of memory cells is further divided into subsets (e.g., memory pages). In some embodiments, the memory cells of a memory block are erased in an erase operation performed with respect to the memory block. In many embodiments, the memory cells of more than one memory block are erased at block 730.

At block 740, processing logic receives a programming command directed to the set of memory cells of the memory block. In some embodiments, the programming command is received subsequent to erasing the sets of memory cells at block 730. In some embodiments, the processing logic further determines that the programming command is with respect to programming single-level cell data to memory cells of a memory block that are erased to an SLC erase state. In some embodiments, the programming command is a "write boost" programming command, meaning that data is to be written as quickly as possible. At block 750, processing logic performs a programming operation with respect to the set of memory cells.

FIG. 7B is a flow diagram of an example method 700B of a memory block erase protocol in accordance with some implementations of the present disclosure. The method 700B can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, the method 700B is performed by the memory sub-system controller 115 and/or the local media controller 135 of FIG. 1.

Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment.

At block 760, processing logic (e.g., of block erase component 113 of FIG. 1) initiates an erase protocol of a memory device. In some embodiments, as described herein, the erase protocol is initiated responsive to the processing logic determining that a metric (e.g., a metric reflective of an average PEC count of the memory device) is below a predetermined threshold. The erase protocol may be terminated responsive to determining that the metric is above the predetermined threshold.

At block 770, as part of the erase protocol initiated at block 760, processing logic determines an amount of available free memory blocks having set of free memory cells. For example, the processing logic may determine how many memory blocks are available for programming (e.g., are not otherwise used and/or storing data that is needed or being used, etc.).

At block 780, based on the amount of available free memory blocks determined at block 770, processing logic erases memory cells of a portion of the available free memory blocks. For example, the processing logic may erase the memory cells of half of the free memory blocks. In another example, the processing logic may erase the memory cells of a third of the free memory blocks. In some embodiments, the processing logic erases only a certain number of memory blocks. For example, the processing logic may cause there to be a predetermined maximum number of erased available free memory blocks. The maximum may be a "cap," such as three erased memory blocks, or eight erased memory blocks, etc. In many embodiments, the free memory blocks are erased in SLC mode for writing SLC data to the memory cells of the erased memory blocks.

Figure 8:
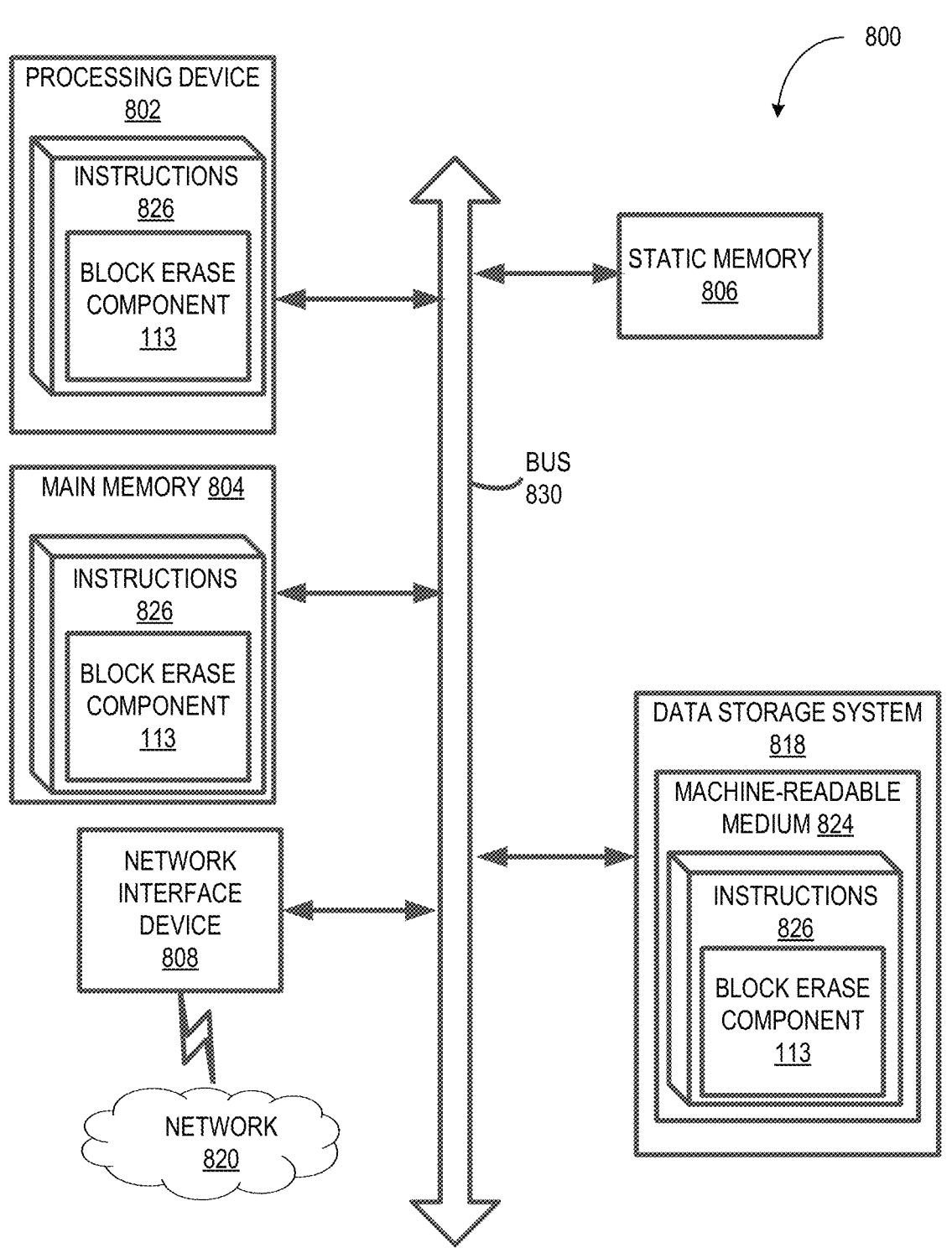
FIG. 8 is a block diagram of an example computer system in which embodiments of the present disclosure can operate.

FIG. 8 illustrates an example machine of a computer system 800 within which a set of instructions, for causing the machine to perform any one or more of the methods discussed herein, can be executed. In some implementations, the computer system 800 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to block erase component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methods discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium, such as a non-transitory computer-readable storage medium, a) on which is stored one or more sets of executable instructions 826 or software embodying any one or more of the methods or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1.

In one embodiment, the instructions 826 include instructions to implement functionality corresponding to block erase component 113 of FIG. 1. While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methods of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device comprising a memory array, the memory array comprising a plurality of memory cells; and
a processing device coupled to the memory device, the processing device to perform operations comprising:
determining a value of a program-erase cycle (PEC) count associated with at least a portion of the plurality of memory cells;
erasing, based on the value of the PEC count, a subset of a portion of free sets of memory cells to form an erased set of memory cells, wherein the erased set of memory cells comprises fewer erased memory cells than a predetermined threshold number of erased memory cells;
receiving a programming command directed to at least a portion of the erased set of memory cells; and
performing, based on the programming command, a programming operation with respect to the at least a portion of the erased set of memory cells.

2. The system of claim 1, wherein the operations further comprise:
determining an amount of free memory blocks comprising sets of free memory cells of the plurality of memory cells; and
erasing memory cells of a portion of the free memory blocks based on the amount of free memory blocks.

3. The system of claim 1, wherein the operations further comprise:
determining that the erased set of memory cells are erased based on a state of a subset of memory cells of the erased set of memory cells,
wherein the programming operation is performed responsive further to determining that the erased set of memory cells are erased.

4. The system of claim 3, wherein the operations further comprise:
determining whether the subset of memory cells are in an erased state; and
performing an erase operation with respect to the erased set of memory cells responsive to determining that the subset of memory cells are not in the erased state.

5. The system of claim 3, wherein the subset of memory cells forms a memory page of a memory block, and wherein determining that the erased set of memory cells are erased is based on a state of the memory page.

6. The system of claim 1, wherein the subset of the portion of free sets of memory cells are erased responsive to determining that the value of the PEC count is less than a predetermined threshold value.

7. The system of claim 1, wherein the operations further comprise:
determining that the programming command is with respect to programming single-level cell (SLC) data, and wherein the erased set of memory cells are erased to an SLC erase state.

8. A non-transitory computer-readable storage medium storing executable instructions that, when executed by a controller managing a memory device, cause the controller to:
determine a value of a program-erase cycle (PEC) count associated with at least a portion of a plurality of memory cells;
erase, based on the value of the PEC count, a subset of a portion of free sets of memory cells to form an erased set of memory cells, wherein the erased set of memory cells comprises fewer erased memory cells than a predetermined threshold number of erased memory cells;
receive a programming command directed to at least a portion of the erased set of memory cells; and
perform, based on the programming command, a programming operation with respect to the at least a portion of the erased set of memory cells.

9. The non-transitory computer-readable storage medium of claim 8, wherein the controller is further to:
determine an amount of free memory blocks comprising sets of free memory cells of the plurality of memory cells; and
erasing memory cells of a portion of the free memory blocks based on the amount of free memory blocks.

10. The non-transitory computer-readable storage medium of claim 8, wherein the controller is further to:
determine that the erased set of memory cells are erased based on a state of a subset of memory cells of the erased set of memory cells,
wherein the programming operation is performed responsive further to determining that the set erased of memory cells are erased.

11. The non-transitory computer-readable storage medium of claim 10, wherein the controller is further to:
determine whether the subset of memory cells are in an erased state; and
perform an erase operation with respect to the erased set of memory cells responsive to determining that the subset of memory cells are not in the erased state.

12. The non-transitory computer-readable storage medium of claim 10, wherein the subset of memory cells forms a memory page of a memory block, and wherein determining that the erased set of memory cells are erased is based on a state of the memory page.

13. The non-transitory computer-readable storage medium of claim 8, wherein the subset of the portion of free sets of memory cells are erased responsive to determining that the value of the PEC count is less than a predetermined threshold value.

14. The non-transitory computer-readable storage medium of claim 8, wherein the controller is further to:
determine that the programming command is with respect to programming single-level cell (SLC) data, and wherein the erased set of memory cells are erased to an SLC erase state.

21

15. A method comprising:

determining a value of a program-erase cycle (PEC) count associated with at least a portion of a plurality of memory cells;

erasing, based on the value of the PEC count, a subset of a portion of free sets of memory cells to form an erased set of memory cells, wherein the erased set of memory cells comprises fewer erased memory cells than a predetermined threshold number of erased memory cells;

receiving a programming command directed to at least a portion of the erased set of memory cells; and performing, based on the programming command, a programming operation with respect to the at least a portion of the erased set of memory cells.

16. The method of claim 15, further comprising:

determining an amount of free memory blocks comprising sets of free memory cells of the plurality of memory cells; and erasing memory cells of a portion of the free memory blocks based on the amount of free memory blocks.

17. The method of claim 15, further comprising:

determining that the erased set of memory cells are erased based on a state of a first subset of memory cells of the erased set of memory cells, wherein the programming operation is performed responsive further to determining that the erased set of memory cells are erased.

18. The method of claim 17, wherein the subset of memory cells forms a memory page of a memory block, and wherein determining that the erased set of memory cells are erased is based on a state of the memory page.

19. The method of claim 15, wherein the subset of the portion of free sets of memory cells are erased responsive to determining that the value of the PEC count is less than a predetermined threshold value.

20. The method of claim 15, further comprising:

determining that the programming command is with respect to programming single-level cell (SLC) data, and wherein the erased set of memory cells are erased to an SLC erase state.

* * * * *